United States Patent Office 3,183,274
Patented May 11, 1965

3,183,274
TRIMETHYLOLPROPANE
Max O. Robeson, Corpus Christi, Tex., assignor to Celanese Corporation of America, New York, N.Y., a corporation of Delaware
No Drawing. Filed Oct. 9, 1956, Ser. No. 614,805
7 Claims. (Cl. 260—635)

This application is a continuation-in-part of my co-pending application Serial No. 511,750, filed May 27, 1955, now abandoned.

This invention relates to the preparation of trimethylolpropane and relates more particularly to a novel method of producing trimethylolpropane from butyraldehyde and formaldehyde.

It is well known in the art to produce trimethylolpropane by the reaction, in aqueous medium, of butyraldehyde, formaldehyde and an alkaline material such as sodium hydroxide according to the equation:

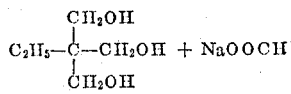

It will be apparent that, according to this equation, a mole of sodium formate is produced for each mole of the desired trimethylolpropane. The separation of the trimethylolpropane from the sodium formate is difficult, particularly since trimethylolpropane is infinitely soluble in water and does not readily crystallize from aqueous solutions.

It has been proposed that the trimethylolpropane be isolated from the aqueous reaction mixture by evaporating a very large part of the water, then adding an organic solvent for the trimethylolpropane, which causes the sodium formate to precipitate from the mixture, and thereafter filtering off the sodium formate. The solvent is then removed by evaporation from the trimethylolpropane dissolved therein. This method does not lend itself readily to commercial operation. During the evaporation of the water the mixture becomes so concentrated that it tends to form a solid precipitate in the apparatus. Furthermore, the trimethylolpropane thus produced still contains an appreciable amount, e.g. 4 to 6%, of sodium formate which is objectionable for certain purposes.

It is an object of this invention to provide a novel and efficient process for the production of trimethylolpropane from butyraldehyde and formaldehyde.

Another object of this invention is the provision of a new process for the separation of trimethylolpropane from sodium formate which will be free from the foregoing and other disadvantages.

Other objects of this invention will be apparent from the following detailed description and claims.

In accordance with one aspect of this invention the aqueous mixture comprising trimethylolpropane and sodium formate is extracted with ethyl acetate to provide two immiscible phases, one a solution of trimethylolpropane in aqueous ethyl acetate, the other a solution of sodium formate in water. Advantageously, this treatment is carried out in continuous countercurrent fashion using a feed mixture of trimethylolpropane and sodium formate whose water content is about 30 to 60%, preferably about 40 to 45%.

To recover the trimethylolpropane from the aqueous ethyl acetate, the extract may be distilled to evaporate the ethyl acetate and water. The residue from this distillation is crude trimethylolpropane containing minor amounts of less volatile impurities. Substantially pure trimethylolpropane may be obtained by distillation of this crude product at subatmospheric pressure, the trimethylolpropane boiling at about 142° C. at a pressure of 3 mm. Hg absolute.

In another method of recovery, the extract of trimethylolpropane in aqueous ethyl acetate may be distilled to remove all of the water as an ethyl acetate-water azeotrope, following which the remaining extract may be treated, as by cooling, to cause crystallization of the trimethylolpropane.

The mixture of trimethylolpropane and sodium formate, referred to above, is advantageously prepared by a process which comprises the steps of continuously reacting, in an aqueous medium, a mixture of butyraldehyde, an excess of formaldehyde, and sodium hydroxide, continuously reducing the pH of the reacted mixture, continuously removing formaldehyde by distillation of the mixture, and treating the resulting mixture to isolate the trimethylolpropane.

In the process of this invention, the reactants, i.e. the formaldehyde, butyraldehyde and sodium hydroxide, are advantageously mixed together in a mixing zone to form a continuous aqueous stream comprising said reactants. For ease of handling and uniformity of mixing, and in order to initiate the reaction in the most satisfactory manner, the formaldehyde and sodium hydroxide are desirably supplied to the mixing zone in the form of aqueous solutions thereof. The reactants may be supplied to the mixing zone as individual streams thereof, or the two aldehydes may be blended together before they are mixed with the sodium hydroxide in the mixing zone. Thus, the aqueous formaldehyde may be blended with the butyraldehyde continuously to produce a stream of aqueous mixed aldehydes and the aqueous solution of alkali metal hydroxide may be injected into this stream in the mixing zone. It is less desirable to mix the sodium hydroxide separately with either aldehyde in the absence of the other aldehyde, since each of the aldehydes is susceptible to undesired autocondensation in the presence of the sodium hydroxide.

For best results the formaldehyde is supplied to the mixing zone in substantial excess over the amount theoretically necessary for reaction with the butyraldehyde. That is, for each mole of butyraldehyde there are supplied at least about 6 moles, e.g. about 6 to 10 moles, preferably about 8 to 10 moles, of formaldehyde. Due to the use of such high proportions of formaldehyde, the reaction is more complete and the yield of trimethylolpropane is increased. Also, the use of such high proportions of formaldehyde suppresses the formation of undesired heat-sensitive compounds which make it difficult to isolate the desired trimethylolpropane from the reacted mixture.

It is also advantageous to employ an amount of sodium hydroxide which is in excess over the amount theoretically necessary for the reaction. Thus, for each mole of butyraldehyde there are preferably supplied about 1.1 to 1.2 moles of sodium hydroxide. However, too large an excess, e.g. more than about 1.5 moles of sodium hydroxide, is less desirable since it promotes side reactions and hinders the isolation of trimethylolpropane from the reaction products.

On mixing, the reactants begin to react vigorously. The conditions in the mixing zone should be such that substantially complete mixing, to produce a homogeneous mixture, takes place rapidly, e.g. within a period of less than one minute. To this end the mixing zone may be in the form of a suitably designed mixing pump, or a pipe in which there is turbulent flow, or an orifice mixer, or a vessel equipped with suitable agitator.

From the mixing zone the reacting mixture is passed in a continuous stream through another zone where the reaction proceeds. This other zone may comprise an apparatus, i.e. a reactor, of any suitable construction; for example, a cylindrical vessel provided with internal baffles to minimize recirculation, or back-mixing, of the mixture passing through it. The capacity of the reactor and the rate of flow of the mixture therethrough are such that the material remains in the reactor for a sufficient period of time to allow the substantial completion of the reactions resulting in the formation of trimethylolpropane at the temperature of reaction.

The exothermic reaction between the butyraldehyde, formaldehyde and sodium hydroxide causes the temperature of the reaction mixture to rise. For optimum results this temperature should rise to a peak which is within the range of about 50 to 60° C.; higher temperatures tend to cause side reactions and color formation, while at lower temperatures the desired reaction proceeds at too slow a rate for efficient practical operation.

Advantageously, the reactor is operated adiabatically, i.e. substantially without adding heat or abstracting any of the heat of reaction. Because of the presence of substantial amounts of water in the reaction mixture the heat capacity of the mixture is relatively high so that the exothermic heat of reaction does not raise the temperature of the mixture to a level above the desired range. For example, the reactants may be mixed at an intial temperature of about 25 to 30° C. and, depending on the amount of water present, the adiabatic increase in temperature may be 25 to 30°. The amount of water, expressed as ratio of water to butyraldehyde, is advantageously between about 15 and 16 to 1. Based on the total weight of the reaction mixture, the water content is preferably about 75 to 80%. This water content is advantageously attained, as described above, by supplying the formaldehyde and sodium hydroxide in the form of aqueous solutions therefo, the formaldehyde preferably being supplied as an aqueous solution containing about 20% of formaldehyde, by weight. When appropriate, the reactor may be heated or cooled to maintain the temperature of the reacting mixture within the optimum range, though such a procedure is less desirable than adiabatic operation.

When the mixture leaves the reactor it is alkaline, generally having a pH of about 9.8 to 10.3, and its pH should be reduced so as to avoid undesirable side reactions in the subsequent processing steps and to prevent any further reaction of formaldehyde and sodium hydroxide. For best results the pH of the reaction mixture leaving the reactor is reduced to about 5.5 to 6.8 preferably about 6.0 to 6.5, by the addition of an acidic material thereto. Suitable acidic materials are formic acid, acetic acid, sulfuric acid or phosphoric acid.

After the addition of the acidic material, the excess unreacted formaldehyde is removed by distillation, at atmospheric or superatmospheric pressure. The formaldehyde distils over as a relatively dilute aqueous solution thereof, sufficient water should be present in, or added to, the mixture being distilled to insure the removal of substantially all of the unreacted formaldehyde. The aqueous distillate may be recycled, as such or after purification, to react with fresh butyraldehyde.

After the removal of the formaldehyde the reaction mixture is concentrated, by evaporation of water, to a water content of about 30 to 60%, preferably 40 to 45%, corresponding to a solids content of about 70 to 40%, preferably 60 to 55%, by weight. The resulting solution is then extracted with ethyl acetate to form two phases as described above. In one convenient and efficient extraction process the extraction is carried out in a packed tower substantially filled with liquid. Ethyl acetate is introduced near the bottom of the tower and the aqueous solution to be treated is fed into the tower at a point above the point of introduction of the ethyl acetate. The ethyl acetate phase, which contains the trimethylolpropane as well as a minor amount of water, is less dense and is accordingly withdrawn from the top, while the other phase leaves from the bottom of the tower. It is found that the extraction proceeds most efficiently at a temperature of about 40 to 70° C., preferably about 50 to 60° C.

In one procedure, the etheyl acetate is introduced into the tower at such a rate that it forms the continuous phase therein at the point of entry of the solution to be extracted and, in fact, throughout most of the tower. In order to insure the substantially complete removal of sodium formate from the ethyl acetate phase, a stream of water is introduced into the tower at a point above the point of entry of the mixture to be extracted. Outstanding results have been obtained in this extraction when the rates of feed to the tower are such that for each pound of aqueous solution to be treated there are supplied about 3.5 (e.g. 3.4 to 3.6) pounds of ethyl acetate and 0.15 to 0.20 pound of additional water.

In another procedure, highly effective to produce a trimethylolpropane having an extremely low sodium formate content, the ethyl acetate constitutes the discontinuous phase at the point of entry of the mixture to be extracted and, in fact, through most of the tower.

The solution of trimethylolpropane in ethyl acetate obtained by the extraction procedure described above may be treated in a number of ways to recover the trimethylolpropane therefrom. In one convenient process the ethyl acetate is removed from this solution by steam distillation, using, for example, saturated steam at atmospheric pressure, and the resulting mixture containing trimethylolpropane is vacuum flashed (e.g. at a pressure of 5 mm. Hg absolute, a liquid temperature of 180 C. and a vapor temperature of 153° C.) to remove high boilers as a residue, and the distillate from the vacuum flashing is fed into a distillation column at a point near the top of said column, said column being maintained under a subatmospheric pressure, e.g. a base pressure of 50 mm. Hg absolute. The trimethylolpropane is removed as a sidestream near the base of this last column and the residue from the column is recycled to the vacuum flasher, while volatile impurities are taken off overhead.

Other methods of recovery of the trimethylolpropane include crystallization and recrystallization, as from solution of the trimethylolpropane in dry ethyl acetate. Thus, crystallization may be carried out, for example, by cooling a heated 40% solution of trimethylolpropane in ethyl acetate to a temperature of 20° C.

It is often desirable, when trimethylolpropane is subjected to distillation or other operation at elevated temperature, to avoid contact between the heated trimethylolpropane and air. This helps to prevent formation of impurities. Air may be excluded, if desired, by blanketing the system with an inert gas such as nitrogen or carbon dioxide.

The following examples are given to illustrate this invention further. All proportions are by weight unless otherwise indicated.

*Example 1*

10,800 parts per hour of 20% aqueous formaldehyde (72 moles) and 652 parts per hour of 98% butyraldehyde (9 moles) are mixed continuously. To the resulting stream there are added continuously 1980 parts per hour of a solution of 396 parts of sodium hydroxide (9.9 moles) in 1584 parts of water. The continuous stream of reaction mixture thus produced is passed continuously through a suitable reactor where the exothermic reaction causes the temperature of the mixture to rise from an initial temperature of 27° C. to a temperature of 58° C. seven minutes after the addition of the sodium hydroxide. The stream of reaction mixture is permitted to react adiabatically while flowing through the reactor for a total period of one hour, during which time the temperature does not rise above 58° C., and is then acidified from a pH of 10.3 to a pH of 6.0 by the addition of 26 parts per hour of acetic acid. The resulting mixture is continuously distilled under a pressure of 15 to 30 p.s.i.g. to reduce the formaldehyde content of the residue to 0.1%. In this step 98% of the excess of formaldehyde over the stoichiometric amount required for the reaction is recovered as a 20% solution thereof. The residue is then continuously evaporated further at atmospheric pressure to a base temperature of 110° C. so that the water content of the residue is reduced to 44.5%, the sodium formate content being 20.0% and substantially all of the balance being trimethylolpropane. The residue is then fed continuously at a uniform rate to an extraction tower, 12 feet high, packed with Berl saddles and maintained at a temperature of 50-53° C. The point of introduction of this feed is 4 feet from the top of the tower. About 3 inches from the bottom of the tower a stream of ethyl acetate is introduced continuously at a uniform rate of 3.24 parts per part of the aforesaid residue feed, while at a point 2 feet from the top of the tower a continuous stream of water is introduced at the rate of 0.18 parts per part of said feed. All the liquids are introduced into the tower by means of spargers. The ethyl acetate phase is the continuous phase through the tower except at the very bottom and dispersed droplets of the other, more dense, phase fall through the ethyl acetate phase to the bottom of the tower. From the base of the tower there is removed a continuous stream of a raffinate comprising water, practically all of the sodium formate and small amounts of ethyl acetate and trimethylolpropane. From the top of the tower there is obtained a continuous stream of extract comprising water, ethyl acetate, trimethylolpropane and only 0.15 part of sodium formate per hundred parts of trimethylolpropane. This extract is steam distilled to remove practically all of the ethyl acetate, then evaporated at subatmospheric pressure to remove all of the water and thereafter distilled at a pressure of 3 mm. Hg absolute at a temperature of 142° C. to obtain a distillate comprising trimethylolpropane of very high purity. The amount of trimethylolpropane thus recovered is 90% of the theoretical, based on the amount of butyraldehyde used.

*Example II*

A crude mixture is produced by reaction of formaldehyde and butyraldehyde in the manner generally described in Example I. This crude mixture contains 43.2% water, 20.8% sodium formate, less than 0.75% formaldehyde and the balance substantially all trimethylolpropane. The crude mixture is fed continuously to an extraction tower 14 feet high packed with Berl saddles and maintained at a temperature of 55-58° C. The point of introduction of the feed is 5 feet from the top of the tower. At a point 3 inches above the bottom of the tower a stream of ethyl acetate is introduced continuously at a uniform rate of 7 parts per part of said crude mixture, while at a point 2 feet below the top of the tower a continuous stream of water is introduced at the rate of 0.4 part per part of said crude mixture. All the liquids are introduced into the tower by means of spargers. The ethyl acetate is in the discontinuous phase, as dispersed droplets, through the tower except at the very top, near the point of introduction of the water. From the base of the tower there is removed a continuous stream of a raffinate comprising water, practically all of the sodium formate and small amounts of ethyl acetate and trimethylolpropane. From the top of the tower there is obtained a continuous stream of extract comprising water, ethyl acetate, trimethylolpropane and less than 0.1 part of sodium formate per hundred parts of trimethylolpropane. This extract is steam distilled to remove practically all of the ethyl acetate, then evaporated at subatmospheric pressure to remove all of the water and thereafter distilled at subatmospheric pressure at obtain a distillate comprising trimethylolpropane of very high purity.

While outstanding results have been obtained by the use of ethyl acetate, the ethyl acetate may be replaced, entirely or in part, by other liquids which are good solvents for trimethylolpropane, which dissolve only small quantities of water and which have low solubilities (e.g. less than 0.5%) in mixtures of water and sodium formate. Thus, butyl and amyl alcohols and ethyl, propyl and butyl esters of formic, acetic and propionic acid may be employed.

It is to be understood that the foregoing detailed description is merely given by way of illustration and that many variations may be made therein without departing from the spirit of my invention.

Having described my invention, what I desire to secure by Letters Patent is:

1. Process for the preparation of trimethylolpropane, which comprises reacting in aqueous medium butyraldehyde, sodium hydroxide and about 6 to 10 moles of formaldehyde per mole of butyraldehyde to obtain an aqueous solution comprising trimethylolpropane and sodium formate and unreacted formaldehyde, distilling off the formaldehyde from said solution, adjusting the water content of the residual solution to about 30 to 60% and extracting said solution with ethyl acetate at a temperature of about 40 to 70° C. to obtain a liquid phase comprising a water solution of sodium formate and a second liquid phase comprising an ethyl acetate solution of trimethylolpropane.

2. Process for the production of trimethylolpropane which comprises continuously reacting, in an aqueous medium, a mixture of butyraldehyde, formaldehyde and sodium hydroxide, there being about 6 to 10 moles of formaldehyde per mole of butyraldehyde, to produce trimethylolpropane and sodium formate, continuously reducing the pH of the reacted mixture, continuously removing unreacted formaldehyde by distillation from the mixture and separating the trimethylolpropane from the sodium formate.

3. Process as set forth in claim 2 in which the trimethylolpropane is separated from the sodium formate by adjusting the concentration of the mixture to provide a water content therein of about 40 to 45% and continuously extracting said mixture with ethyl acetate by passing said mixture continuously into an extraction tower, introducing a stream of ethyl acetate into said tower at a point above the point of introduction of said mixture, withdrawing from the bottom of said tower a stream of raffinate comprising a solution of sodium formate in water, withdrawing from the top of said tower a stream of extract comprising a solution of trimethylolpropane in aqueous ethyl acetate, removing the ethyl acetate and water from said extract by evaporation and distilling trimethylolpropane from the residue of said evaporation under subatmospheric pressure.

4. Process for the production of trimethylolpropane which comprises continuously reacting, in an aqueous medium, a mixture of butyraldehyde, formaldehyde and sodium hydroxide, there being about 6 to 10 moles of formaldehyde per mole of butyraldehyde, to produce trimethylolpropane and sodium formate and separating the trimethylolpropane from the sodium formate.

5. Process as set forth in claim 4 and in which the reacted mixture is treated with an acid to reduce its pH and is then distilled to separate unreacted formaldehyde at at least atmospheric pressure.

6. Process as set forth in claim 4 in which during said reaction the temperature rises to about 50 to 60° C.

7. Process as set forth in claim 4 in which the formaldehyde, butyraldehyde and sodium hydroxide are mixed at such a rate that substantially complete mixing to produce a homogeneous mixture takes place in less than one minute.

(References on following page)

References Cited by the Examiner

UNITED STATES PATENTS

| | | | |
|---|---|---|---|
| Re. 23,584 | 11/52 | Jackson et al. | 260—635 |
| 2,004,010 | 6/35 | Naujoks | 260—635 |
| 2,135,063 | 11/38 | Walker et al. | 260—635 |
| 2,292,926 | 8/42 | Brubaker et al. | 260—635 |
| 2,369,083 | 2/45 | Spurlin | 260—635 |
| 2,407,920 | 9/46 | Cox | 260—635 |
| 2,420,496 | 5/47 | Poitras et al. | 260—635 |
| 2,479,041 | 8/49 | Elgin | 260—637 |
| 2,468,718 | 4/49 | Wyler | 260—635 |
| 2,562,102 | 7/51 | Jackson et al. | 260—635 |
| 2,671,118 | 3/54 | Gangwer | 260—637 |
| 2,761,881 | 9/56 | Rosin | 260—635 |
| 2,786,083 | 3/57 | Wyler | 260—635 |
| 2,790,836 | 4/57 | Mitchell et al. | 260—635 |
| 2,790,837 | 4/57 | Robeson | 260—635 |
| 2,806,889 | 9/57 | Gottesman et al. | 260—635 |
| 2,806,890 | 9/57 | Gottesman | 260—637 |
| 2,806,891 | 9/57 | Gottesman et al. | 260—635 |
| 2,806,892 | 9/57 | De Lorenzo | 260—635 |

FOREIGN PATENTS

| | | |
|---|---|---|
| 730,759 | 5/55 | Great Britain. |
| 1,081,691 | 6/54 | France. |

OTHER REFERENCES

Lucas et al.: "Principles and Practice in Org. Chem.," Wiley, N.Y., pp. 80–1 (1949).

Craig et al.: Tech. of Org. Chem., vol. III (1950), Interscience, N.Y., pp. 253–4, 296–7.

LEON ZITVER, *Primary Examiner.*

NATHAN MARMELSTEIN, CHARLES B. PARKER,
*Examiners.*